US 8,794,638 B2

(12) United States Patent
Tuckness et al.

(10) Patent No.: US 8,794,638 B2
(45) Date of Patent: Aug. 5, 2014

(54) SEALING ARRAY FOR HIGH TEMPERATURE APPLICATIONS

(75) Inventors: Ira Gene Tuckness, Coppell, TX (US); Russell Irving Bayh, III, Carrollton, TX (US); David Lynn Reesing, Irving, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 395 days.

(21) Appl. No.: 12/394,569

(22) Filed: Feb. 27, 2009

(65) Prior Publication Data
US 2010/0219592 A1 Sep. 2, 2010

(51) Int. Cl.
*F16J 15/02* (2006.01)
*F16J 15/20* (2006.01)
*E21B 33/10* (2006.01)
*F16J 15/26* (2006.01)
*E21B 33/00* (2006.01)

(52) U.S. Cl.
CPC ............... *F16J 15/20* (2013.01); *E21B 33/10* (2013.01); *E21B 2033/005* (2013.01); *F16J 15/26* (2013.01)
USPC ........... 277/638; 277/335; 277/138; 277/510; 277/511; 277/529; 277/611; 277/584; 277/531

(58) Field of Classification Search
USPC ......... 277/510, 511, 138, 529, 530, 531, 584, 277/611, 638; 166/84.1, 84.5, 179, 180, 166/191, 195, 196, 387
See application file for complete search history.

(56) References Cited

U.S. PATENT DOCUMENTS

| 753,494 | A | * | 3/1904 | James | 277/530 |
|---|---|---|---|---|---|
| 917,690 | A | * | 4/1909 | Weese | 277/530 |
| 2,264,147 | A | * | 11/1941 | Dunlevy | 277/530 |
| 2,797,971 | A | * | 7/1957 | Greenough | 277/448 |
| 2,973,978 | A | | 3/1961 | Oppenheim | |

(Continued)

FOREIGN PATENT DOCUMENTS

| EP | 0227474 | 7/1987 |
|---|---|---|
| GB | 2055993 | 3/1981 |
| GB | 2202283 | 9/1988 |

OTHER PUBLICATIONS merriam webster web definition, "chevron", accessed May 6, 2011 via http://www.merriam-webster.com/dictionary/chevron?show=0&t=1304692565, Merriam-Webster, Inc., 2011.*

(Continued)

*Primary Examiner* — Kristina Fulton
*Assistant Examiner* — Eugene G Byrd
(74) *Attorney, Agent, or Firm* — Lawrence R. Youst

(57) ABSTRACT

A sealing array for positioning in an annular space between tubular members to provide a seal therebetween. The sealing array includes a pair of oppositely disposed backup rings, each defining a primary outer seal member of the sealing array. A pair of rigid cap rings is disposed between the backup rings. Each cap ring has a substantially planar surface and an oppositely disposed surface that engages one of the backup rings to energize the backup rings upon the application of sufficient pressure. The cap rings are sized to form controlled extrusion gaps with both tubular members. An energizing element is disposed between the planar surfaces of the cap rings. The energizing element engages a planar surface of at least one of the cap rings and seals the extrusion gaps associated with the engaged cap ring upon the application of sufficient pressure.

19 Claims, 4 Drawing Sheets

(56) References Cited

U.S. PATENT DOCUMENTS

| | | | | |
|---|---|---|---|---|
| 3,767,215 | A | * | 10/1973 | Brown ............................ 277/638 |
| 4,027,816 | A | * | 6/1977 | Slator et al. .................... 277/437 |
| 4,116,451 | A | | 9/1978 | Nixon et al. |
| 4,234,197 | A | | 11/1980 | Amancharla |
| 4,406,469 | A | | 9/1983 | Allison |
| 4,415,169 | A | * | 11/1983 | Kim ............................... 277/300 |
| 4,473,231 | A | | 9/1984 | Tilton et al. |
| 4,811,959 | A | * | 3/1989 | Bullard et al. ................. 277/342 |
| 4,886,241 | A | * | 12/1989 | Davis et al. .................... 251/214 |
| 5,056,757 | A | * | 10/1991 | Wood ............................ 251/214 |
| 5,263,683 | A | | 11/1993 | Wong |
| 5,297,805 | A | | 3/1994 | Merkin et al. |
| 5,309,993 | A | | 5/1994 | Coon et al. |
| 5,492,173 | A | | 2/1996 | Kilgore et al. |
| 5,509,476 | A | * | 4/1996 | Vick, Jr. ...................... 166/75.13 |
| 5,611,547 | A | | 3/1997 | Baugh et al. |
| 5,615,896 | A | | 4/1997 | Morvant |
| 5,765,641 | A | | 6/1998 | Shy et al. |
| 6,026,903 | A | | 2/2000 | Shy et al. |
| 6,076,600 | A | | 6/2000 | Vick, Jr. et al. |
| 6,182,974 | B1 | | 2/2001 | Harrelson, III |
| 6,318,729 | B1 | | 11/2001 | Pitts, Jr. et al. |
| 6,406,028 | B1 | | 6/2002 | Kannan |
| 6,763,892 | B2 | | 7/2004 | Kaszuba |
| 6,924,745 | B2 | | 8/2005 | Schultz et al. |
| 7,191,843 | B2 | * | 3/2007 | Wong ............................ 166/386 |
| 7,401,788 | B2 | | 7/2008 | Williams et al. |
| 7,472,756 | B2 | * | 1/2009 | Wong ............................ 166/386 |
| 7,751,677 | B2 | * | 7/2010 | Dunphy et al. ............... 385/138 |
| 7,828,301 | B2 | * | 11/2010 | Briscoe et al. ................. 277/611 |
| 2005/0109502 | A1 | * | 5/2005 | Buc Slay et al. ............. 166/179 |
| 2008/0166099 | A1 | * | 7/2008 | Dunphy et al. ............... 385/138 |

OTHER PUBLICATIONS

"extended." Merriam-Webster.com. 2011. Retrieved Oct. 17, 2011, from http://www.merriam-webster.com/dictionary/extended?show=0&t=1318951101, see line item 6.*

ISR and Written Opinion (International Searching Authority—EPO) Sep. 27, 2010.

Seal Assembly with Energized Graphite Seals and a Protective Shroud for use in Steam Injection and other Extreme High-Temperature Applications, IP.com (Oct. 1, 2008).

* cited by examiner

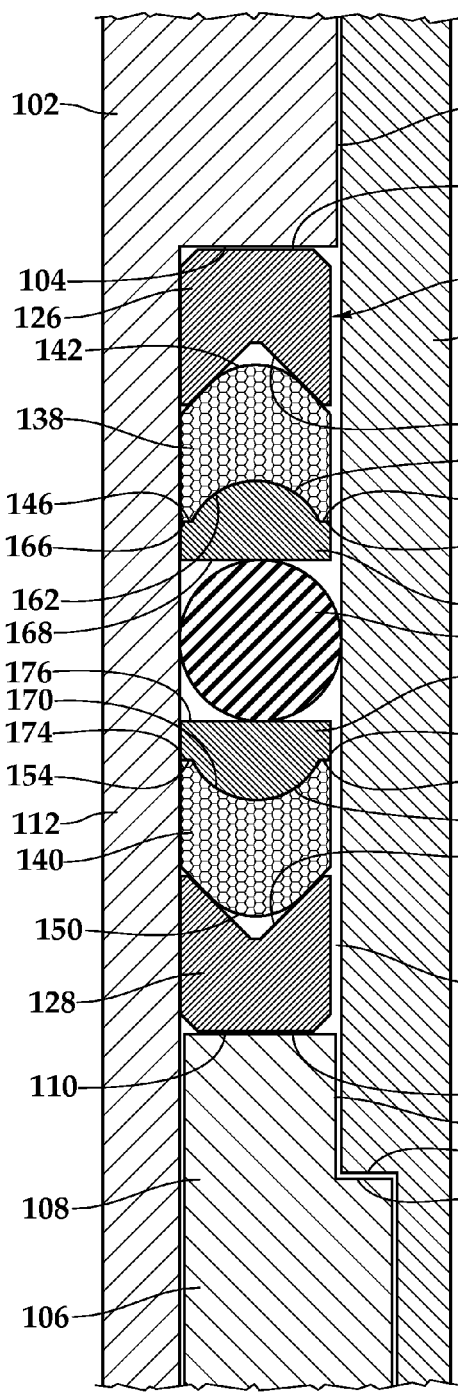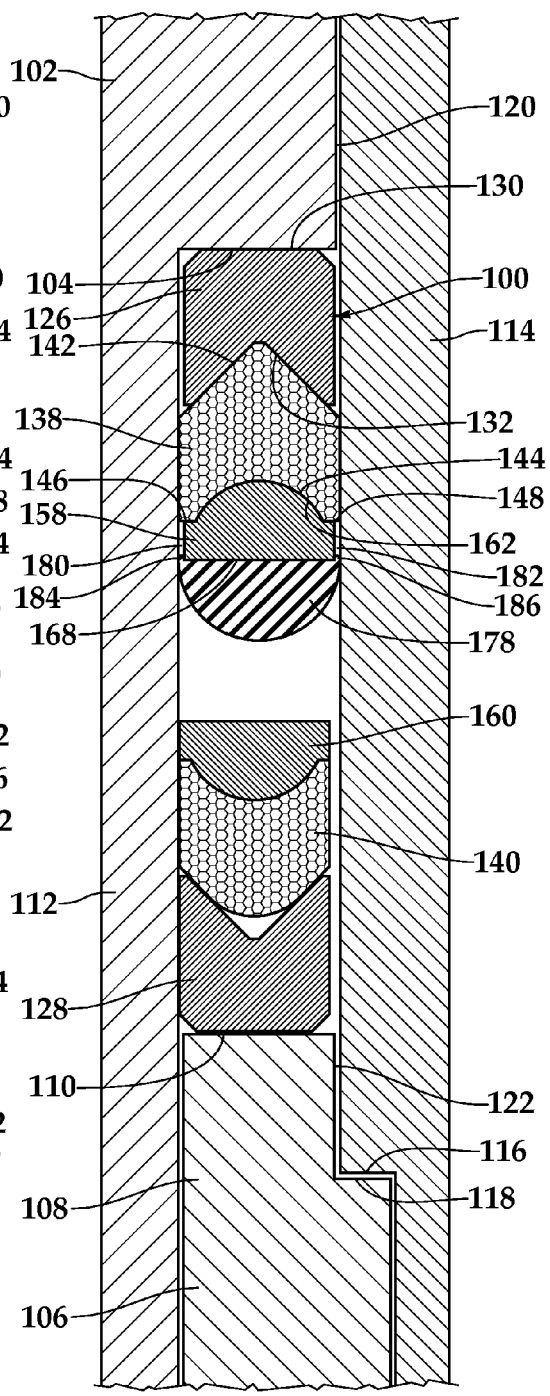
*Fig.1*  *Fig.2*

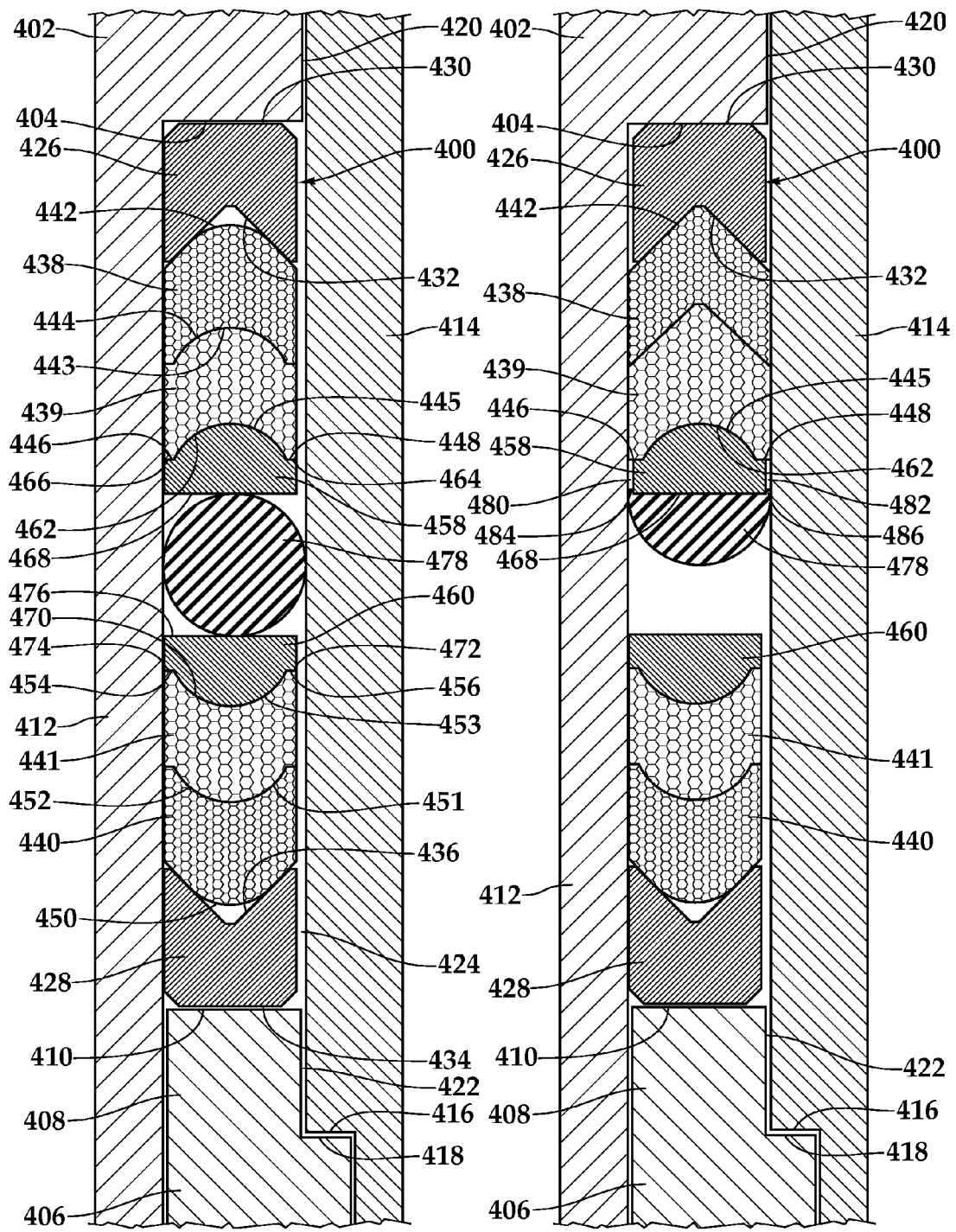

SEALING ARRAY FOR HIGH TEMPERATURE APPLICATIONS

TECHNICAL FIELD OF THE INVENTION

This invention relates, in general, to an improved sealing system for use in high temperature applications and, in particular, to a sealing array that includes a configuration of an energizing element, cap rings and backup rings that provide for enhanced sealing in high temperature applications.

BACKGROUND OF THE INVENTION

Without limiting the scope of the present invention, its background is described with reference to sealing in high temperature steam applications, as an example.

It is well known in the oil and gas extraction art that an O-ring may be used to form an effective seal between two cylindrically shaped parts that cooperate in either a static or dynamic environment. Typically, one of the cooperating parts will include a gland groove in which the O-ring type seal is placed. In order to establish the desired seal between the two parts, the O-ring must be under contact stress with both parts during operations. According to one common practice, the O-ring gland groove is disposed on the inner cooperating part and has a diameter slightly larger than the inner diameter of the O-ring and wider than the cross section of the O-ring. This design provides the desired contact stress to the O-ring and allows axial movement of the O-ring as it is inserted into the sealing area.

It has been found, however, in certain high temperature installations, that the useful life of such a single O-ring in a gland groove is limited. This is due, in part, to the tendency of the elastomeric O-ring materials to extrude into the clearance gap between the cooperating parts. To overcome this deficiency, use of a packing stack or sealing array that includes a centrally disposed O-ring seal and one or more O-ring support members positioned on either side of the O-ring, has been attempted. The O-ring support members, which are also referred to as backup rings, commonly include V-rings, which are V-shaped or Chevron type packing rings with a concave, V-shaped bottom surface, a convex top surface and straight sides. According to this practice, the centrally disposed O-ring and the backup rings work together to provide the desired seal, with the aforementioned clearance gap being filled by the backup rings, thereby preventing O-ring extrusion.

It has been found, however, that in very high temperature applications, such as steam applications, the useful life of conventional sealing arrays is limited. For example, that material of the O-ring seals tends to diffuse into or become integrally bonded with the material of the adjacent V-ring seals, resulting in a loss of the round cross section of the O-ring seals. This loss of geometric integrity not only limits the sealing capability of the O-ring itself but also limits the O-ring's ability to energize the V-rings, thereby reducing or eliminating contact at the sealing boundaries.

Therefore, a need has arisen for a sealing array that provides the desired sealing functionality between cooperating parts. A need has also arisen for such a sealing array that is capable of maintaining the desired sealing functionality in high temperature applications. Further, a need has arisen for such a sealing array that is capable of maintaining the desired sealing functionality in very high temperature applications including steam applications.

SUMMARY OF THE INVENTION

The present invention disclosed herein comprises a sealing array that provides the desired sealing functionality between cooperating parts. The sealing array of the present invention is capable of maintaining the desired sealing functionality in high temperature applications. In addition, the sealing array of the present invention is capable of maintaining the desired sealing functionality in very high temperature applications including steam applications.

In one aspect, the present invention is directed to a sealing array for positioning in an annular space between tubular members to provide a seal therebetween. The sealing array includes a pair of oppositely disposed backup rings, each having a concave surface and each defining a primary outer seal member of the sealing array. A pair of rigid cap rings is disposed between the backup rings. Each of the cap rings has a convex surface and an oppositely disposed substantially planar surface. The convex surface of each of the cap rings engages a concave surface of one of the backup rings to energize the backup rings upon the application of sufficient pressure. The cap rings are sized to form extrusion gaps with both tubular members. An energizing element is disposed between the planar surfaces of the cap rings. The energizing element engages a planar surface of at least one of the cap rings and seals the extrusion gaps associated with the engaged cap ring upon the application of sufficient pressure.

In one embodiment, the backup rings may be V-rings. In another embodiment, the backup rings may have a chevron-shape. In a further embodiment, the backup rings may be formed from a material with a very low thermal expansion coefficient and high lubricity such as a flexible graphite or may be formed from a polymeric material including a thermoplastic, an elastomer, a fluoropolymer or the like.

In one embodiment, the caps rings may be D-rings. In another embodiment, the caps rings may be extended D-rings. In a further embodiment, the caps rings may be formed from a metal such as a stainless steel, a polymer such as a thermally resistant polymer, a rigid composite material or the like. In yet another embodiment, the energizing element may be an O-ring formed from a polymer and preferably an elastomer.

In one embodiment, one or more addition pairs of backup rings may be used. In this embodiment, each of the additional backup rings forms a secondary outer seal member having a concave surface engaging a convex surface of one of the primary outer seal members or one of the other secondary outer seal members. In another embodiment, a pair of adaptor members may be used. Each of the adaptor members has a concave surface engaging a convex surface of one of the primary outer seal members or one of the secondary outer seal members. In this embodiment, the adaptor members may be formed from a metal such as a stainless steel, a polymer such as a thermally resistant polymer, a rigid composite material or the like.

In another aspect, the present invention is directed to a sealing array for positioning in an annular space between tubular members to provide a seal therebetween. The sealing array includes a pair of oppositely disposed flexible graphite V-rings, each having a concave surface and each defining a primary outer seal member of the sealing array. A pair of stainless steel extended D-rings is positioned between the V-rings. Each of the D-rings has a convex surface and an oppositely disposed substantially planar surface. The convex surface of each of the D-rings engages a concave surface of one of the V-rings to energize the V-rings upon the application of sufficient pressure. The D-rings are sized to form extrusion gaps with both tubular members. An O-ring formed from a temperature resistant material such as ethylene propylene diene monomer is disposed between the planar surfaces of the D-rings. The O-ring engages a planar surface of at least one of the D-rings and seals the extrusion gaps associated with the engaged D-ring upon the application of sufficient pressure.

In a further aspect, the present invention is directed to a sealing array for positioning in an annular space between tubular members to provide a seal therebetween. The sealing array includes a pair of oppositely disposed backup rings, each defining a primary outer seal member of the sealing array. A pair of rigid cap rings is disposed between the backup rings. Each cap ring having a substantially planar surface and an oppositely disposed surface that engages one of the backup rings to energize the backup rings upon the application of sufficient pressure. The cap rings are sized to form extrusion gaps with both tubular members. An energizing element is disposed between the planar surfaces of the cap rings. The energizing element engages a planar surface of at least one of the cap rings and seals the extrusion gaps associated with the engaged cap ring upon the application of sufficient pressure.

In a yet another aspect, the present invention is directed to a sealing array for positioning in an annular space between tubular members to provide a seal therebetween. The sealing array includes a backup ring that defines a primary outer seal member of the sealing array, a rigid cap ring having a substantially planar surface and an oppositely disposed surface that engages a surface of the backup ring to energize the backup ring upon the application of sufficient pressure, the cap ring sized to form extrusion gaps with both tubular members and an energizing element operably engageable with the substantially planar surface of the cap ring to provide a seal in the extrusion gaps associated with the cap ring upon the application of sufficient pressure.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a cross sectional view of a sealing array positioned in a gland groove in its resting configuration according to an embodiment of the present invention;

FIG. 2 is a cross sectional view of the sealing array of FIG. 1 positioned in a gland groove in its energized and sealing configuration according to an embodiment of the present invention;

FIG. 7 is a cross sectional view of a sealing array positioned in a gland groove in its resting configuration according to an embodiment of the present invention; and FIG. 8 is a cross sectional view of the sealing array of FIG. 7 positioned in a gland groove in its energized and sealing configuration according to an embodiment of the present invention.

DETAILED DESCRIPTION OF THE INVENTION

Figures 3, 4:
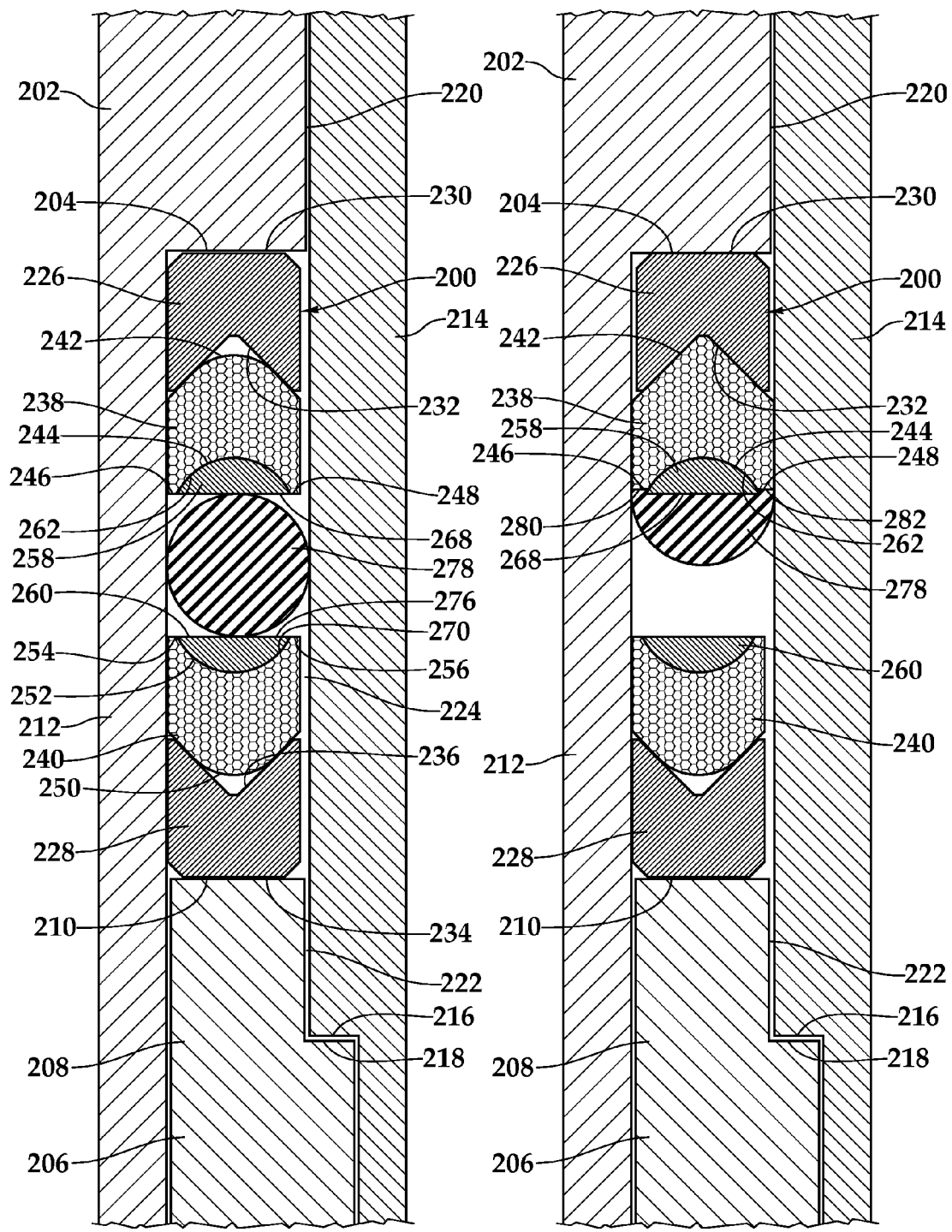
FIG. 3 is a cross sectional view of a sealing array positioned in a gland groove in its resting configuration according to an embodiment of the present invention.
FIG. 4 is a cross sectional view of the sealing array of FIG. 3 positioned in a gland groove in its energized and sealing configuration according to an embodiment of the present invention.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Referring initially to FIG. 1, therein is depicted a sealing array according to an embodiment of the present invention that is positioned between cooperating tubular members and is generally designated 100. In the illustrated section of the tubing system, an outer tubular section 102 includes shoulder 104. Operably associated with outer tubular section 102 is an outer tubular section 106 which may be threadably coupled to outer tubular section 102 or otherwise fixed relative thereto. Outer tubular section 106 includes an upper end portion 108 and an upper surface 110. Upper end portion 108 of outer tubular section 106 is received within a radially reduced portion 112 of outer tubular section 102. Together, shoulder 104 and radially reduced portion 112 of outer tubular section 102 and upper surface 110 of outer tubular section 106 form a gland groove for housing sealing array 100. In one example, outer tubular section 102 and outer tubular section 106 are consecutively disposed tubular members in a downhole tubular string with sealing array 100 positioned to the interior of the downhole tubular string.

Disposed adjacent of outer tubular section 102 and outer tubular section 106 is a tubular member 114. In the illustrated embodiment, tubular member 114 includes a shoulder 116 that interacts with no-go shoulder 118 of outer tubular section 106. As an example, tubular member 114 may be one tool in a wireline conveyed tool system that is inserted into the tubular string including outer tubular section 102 and outer tubular section 106. As illustrated, a clearance gap 120 exists between tubular member 114 and outer tubular section 102, a clearance gap 122 exists between tubular member 114 and outer tubular section 106, and a clearance gap 124 generally exists between tubular member 114 and sealing array 100. Clearance gaps 120, 122, 124 allow for the insertion and removal of tubular member 114 from outer tubular section 102 and outer tubular section 106 with minimal resistance and without damage to sealing array 100.

Sealing array 100 includes a pair of oppositely disposed adaptor members 126, 128. As illustrated in the cross sectional view of FIG. 1, upper adaptor member 126 has a substantially planar surface 130 that is adjacent to shoulder 104 of outer tubular section 102. Upper adaptor member 126 also has a substantially V-shaped lower surface 132. Likewise, lower adaptor member 128 has a substantially planar surface 134 that is adjacent to upper surface 110 of outer tubular section 106. Lower adaptor member 128 also has a substantially V-shaped upper surface 136. Adaptor members 126, 128 are both substantially ring shaped and are sized to fit in the cylindrical gland groove created between outer tubular sections 102, 106 and between radially reduced portion 112 of outer tubular section 102 and tubular member 114. Preferably, adaptor members 126, 128 are formed from a rigid material including plastics, composites or metals. In high temperature applications including steam applications, adaptor members 126, 128 are preferably formed from a stainless steel including corrosion resistant, 9-chrome, 13-chrome and nickel alloy stainless steels.

Sealing array 100 includes a pair of oppositely disposed backup rings 138, 140. As illustrated in the cross sectional view of FIG. 1, upper backup ring 138 has a substantially arc shaped convex surface 142 that is adjacent to substantially V-shaped surface 132 of adaptor member 126. Upper backup ring 138 also has a substantially arc shaped concave surface 144 with substantially planer outer segments 146, 148. Likewise, lower backup ring 140 has a substantially arc shaped convex surface 150 that is adjacent to substantially V-shaped surface 136 of adaptor member 128. Lower backup ring 140 also has a substantially arc shaped concave surface 152 with substantially planer outer segments 154, 156. Backup rings 138, 140 are both substantially ring shaped and are sized to fit in the cylindrical gland groove created between outer tubular sections 102, 106 and between radially reduced portion 112 of outer tubular section 102 and tubular member 114. Preferably, backup rings 138, 140 are formed from a polymer such as a thermoplastic including polyetheretherketone (PEEK), an elastomer including ethylene propylene diene monomer (EPDM) or a fluoropolymer including polytetrafluoroethylene (PTFE). In certain high temperature applications including steam applications, backup rings 138, 140 are preferably formed from a flexible graphite including Grafoil® and Grafoil® composites. It should be understood by those skilled in the art that other materials could alternatively be used to form backup rings 138, 140 with the material being selected based upon factors such as chemical compatibility, application temperature, sealing pressure and the like.

Sealing array 100 includes a pair of oppositely disposed cap rings 158, 160 depicted in the form of extended D-rings. As illustrated in the cross sectional view of FIG. 1, upper cap ring 158 has a substantially arc shaped convex surface 162 with substantially planer outer segments 164, 166 that nest with substantially arc shaped concave surface 144 and substantially planer outer segments 146, 148 of backup ring 138. Upper cap ring 158 also has a substantially planar surface 168. Likewise, lower cap ring 160 has a substantially arc shaped convex surface 170 with substantially planer outer segments 172, 174 that nest with substantially arc shaped concave surface 152 and substantially planer outer segments 154, 156 of backup ring 140. Lower cap ring 160 also has a substantially planar surface 176. Cap rings 158, 160 are both substantially ring shaped and are sized to fit in the cylindrical gland groove created between outer tubular sections 102, 106 and between radially reduced portion 112 of outer tubular section 102 and tubular member 114. Preferably, cap rings 158, 160 are formed from a rigid material including plastics, composites or metals. In high temperature applications including steam applications, cap rings 158, 160 are preferably formed from a stainless steel including corrosion resistant, 9-chrome, 13-chrome and nickel alloy stainless steels.

Sealing array 100 includes an energizing element depicted as O-ring seal 178 positioned between cap rings 158, 160. O-ring seal 178 is substantially ring shaped and is sized to fit in the cylindrical gland groove created between outer tubular sections 102, 106 and between radially reduced portion 112 of outer tubular section 102 and tubular member 114. Preferably, O-ring seal 178 is formed from an elastomer such as a synthetic rubber, a butadiene rubber (BR), a nitrile rubber (NBR), a fluoroelastomer (FKM), a perfluoroelastomer (FFKM) or other thermoset material. In high temperature applications including steam applications, O-ring seal 178 is preferably formed from an ethylene propylene diene monomer (EPDM). It should be understood by those skilled in the art that other materials could alternatively be used to form O-ring seal 178 with the material being selected based upon factors such as chemical compatibility, application temperature, sealing pressure and the like. In addition, even though the energizing element has been depicted as O-ring seal 178, those skilled in the art should recognize that the energizing element could have a alternate configurations, including, but not limited to, quad rings, square block seals, beta seals and the like, which allow the energizing element to energize sealing array 100 when sufficient pressure is applied thereto and which allow the energizing element to engage in controlled wedging into the extrusion gaps as described below.

Even though FIG. 1 depicts the sealing array of the present invention in a vertical orientation, it should be understood by those skilled in the art that the sealing arrays of the present invention are equally well suited for use in other directional orientations including horizontal and slanted orientations. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure.

The operation of sealing array 100 will now be described with reference to FIG. 2. Sealing array 100 is a bidirectional sealing array. Specifically, sealing array 100 is designed to prevent pressure from escaping from the region above clearance gap 120 into the region below clearance gap 122 when the pressure in the region above clearance gap 120 is higher than the pressure in the region below clearance gap 122. Likewise, sealing array 100 is designed to prevent pressure from escaping from the region below clearance gap 122 into the region above clearance gap 120 when the pressure in the region below clearance gap 122 is higher than the pressure in the region above clearance gap 120. In the embodiment illustrated in FIG. 2, the pressure in the region below clearance gap 122 is higher than the pressure in the region above clearance gap 120. Accordingly, the upper portion of sealing array 100 has been energized and is providing a seal that prevents pressure from escaping from the region below clearance gap into the region above clearance gap 120.

As illustrated, the pressure has caused O-ring to become compressed against surface 168 of cap ring 158. The force acting on cap ring 158 presses cap ring 158 into backup ring 138 and likewise presses backup ring 138 into adaptor member 126. The interaction between surface 162 of cap ring 158 and surface 144 of backup ring 138 as well as the interaction between surface 132 of adaptor member 126 and surface 142 of backup ring 138 causes backup ring to be energized resulting in longitudinal compression and radial expansion of backup ring 138. The energized backup ring 138 establishes a seal against the inner surface of radially reduced portion 112 of outer tubular section 102 and the outer surface of tubular member 114. The seal created by energized backup ring 138 is referred to herein as a primary outer seal.

In addition to applying the upwardly directed force on backup ring 138, cap ring 158 is substantially centered between the inner surface of radially reduced portion 112 of outer tubular section 102 and the outer surface of tubular member 114, thereby forming narrow extrusion gaps 180, 182 therebetween. Under sufficient pressure, as depicted in FIG. 2, O-ring 178 extrudes into extrusion gaps 180, 182 as illustrated at 184 and 186. Accordingly, the configuration of seal array 100 allows a desirable amount of O-ring extrusion to assure a complete seal but prevents excessive O-ring extrusion through the use of backup ring 138 which establishes a barrier to additional O-ring extrusion at 146, 148 when backup ring 138 is energized. The extent of the O-ring extrusion may be determined by the length of the extended portion of cap ring 158 when cap ring 158 has the extended D-ring shape, as depicted.

In addition to applying the upwardly directed force to energize backup ring 138 and establishing the extrusion gaps to assure a complete seal, cap ring 158 provides a barrier between O-ring 178 and backup ring 138 which prevents physical and chemical interaction therebetween. Specifically, the barrier created by cap ring 158 prevents the aforementioned loss of geometric integrity that occurs when the material of an O-ring chemically interacts with the material of a backup ring. Accordingly, as cap ring 158 prevents chemical and physical interaction between O-ring 178 and backup ring 138 during operation, the useful life of sealing array 100 is extended.

Referring now to FIG. 3, therein is depicted a sealing array according to an embodiment of the present invention that is positioned between cooperating tubular members and is generally designated 200. A tubing system includes outer tubular section 202 with shoulder 204 and outer tubular section 206 with upper end portion 208 and upper surface 210 which is received within a radially reduced portion 212 of outer tubular section 202. Together, shoulder 204 and radially reduced portion 212 of outer tubular section 202 and upper surface 210 of outer tubular section 206 form a gland groove for housing sealing array 200. Disposed adjacent to outer tubular section 202 and outer tubular section 206 is a tubular member 214 that includes a shoulder 216 that interacts with no-go shoulder 218 of outer tubular section 206. As illustrated, a clearance gap 220 exists between tubular member 214 and outer tubular section 202, a clearance gap 222 exists between tubular member 214 and outer tubular section 206, and a clearance gap 224 generally exists between tubular member 214 and sealing array 200.

Sealing array 200 includes a pair of oppositely disposed adaptor members 226, 228. As illustrated in the cross sectional view of FIG. 3, upper adaptor member 226 has a substantially planar surface 230 that is adjacent to shoulder 204 of outer tubular section 202. Upper adaptor member 226 also has a substantially V-shaped lower surface 232. Likewise, lower adaptor member 228 has a substantially planar surface 234 that is adjacent to upper surface 210 of outer tubular section 206. Lower adaptor member 228 also has a substantially V-shaped upper surface 236. Adaptor members 226, 228 are both substantially ring shaped and are sized to fit in the cylindrical gland groove created between outer tubular sections 202, 206 and between radially reduced portion 212 of outer tubular section 202 and tubular member 214.

Sealing array 200 includes a pair of oppositely disposed backup rings 238, 240. As illustrated in the cross sectional view of FIG. 3, upper backup ring 238 has a substantially arc shaped convex surface 242 that is adjacent to substantially V-shaped surface 232 of adaptor member 226. Upper backup ring 238 also has a substantially arc shaped concave surface 244 with substantially planer outer segments 246, 248. Likewise, lower backup ring 240 has a substantially arc shaped convex surface 250 that is adjacent to substantially V-shaped surface 236 of adaptor member 228. Lower backup ring 240 also has a substantially arc shaped concave surface 252 with substantially planer outer segments 254, 256. Backup rings 238, 240 are both substantially ring shaped and are sized to fit in the cylindrical gland groove created between outer tubular sections 202, 206 and between radially reduced portion 212 of outer tubular section 202 and tubular member 214.

Sealing array 200 includes a pair of oppositely disposed cap rings 258, 260 depicted in the form of D-rings. As illustrated in the cross sectional view of FIG. 3, upper cap ring 258 has a substantially arc shaped convex surface 262 that nests with substantially arc shaped concave surface 244 of backup ring 238. Upper cap ring 258 also has a substantially planar surface 268. Likewise, lower cap ring 260 has a substantially arc shaped convex surface 270 that nests with substantially arc shaped concave surface 252 of backup ring 240. Lower cap ring 260 also has a substantially planar surface 276. Cap rings 258, 260 are both substantially ring shaped and are sized to fit in the cylindrical gland groove created between outer tubular sections 202, 206 and between radially reduced portion 212 of outer tubular section 102 and tubular member 214. In addition, sealing array 200 includes an O-ring seal 278 positioned between cap rings 258, 260. O-ring seal 278 is substantially ring shaped and is sized to fit in the cylindrical gland groove created between outer tubular sections 202, 206 and between radially reduced portion 212 of outer tubular section 202 and tubular member 214.

The operation of sealing array 200 will now be described with reference to FIG. 4. As with sealing array 100, sealing array 200 is a bidirectional sealing array. In the illustrated embodiment, the pressure in the region below clearance gap 222 is higher than the pressure in the region above clearance gap 220. Accordingly, the upper portion of sealing array 200 has been energized and is providing a seal that prevents pressure from escaping from the region below clearance gap 222 into the region above clearance gap 220.

As illustrated, the pressure has caused O-ring 278 to become compressed against surface 268 of cap ring 258. The force acting on cap ring 258 presses cap ring 258 into backup ring 238 and likewise presses backup ring 238 into adaptor member 226. The interaction between surface 262 of cap ring 258 and surface 244 of backup ring 238 as well as the interaction between surface 232 of adaptor member 226 and surface 242 of backup ring 238 causes backup ring to be energized resulting in longitudinal compression and radial expansion of backup ring 238. The energized backup ring 238 establishes a seal against the inner surface of radially reduced portion 212 of outer tubular section 202 and the outer surface of tubular member 214.

In addition to applying the upwardly directed force on backup ring 238, cap ring 258 is substantially centered between the inner surface of radially reduced portion 212 of outer tubular section 202 and the outer surface of tubular member 214, thereby forming narrow extrusion gaps 280, 282 therebetween. Under sufficient pressure, as depicted in FIG. 4, O-ring 278 extrudes into the extrusion gaps. Accordingly, the configuration of seal array 200 allows a desirable amount of O-ring extrusion to assure a complete seal but, prevents excessive O-ring extrusion through the use of backup ring 238 which establishes a barrier to additional O-ring extrusion at 246, 248 when backup ring 238 is energized.

In addition to applying the upwardly directed force to energize backup ring 238 and establishing the extrusion gaps to assure a complete seal, cap ring 258 provides a barrier between O-ring 278 and backup ring 238 which prevents physical and chemical interaction therebetween.

Figures 5, 6:
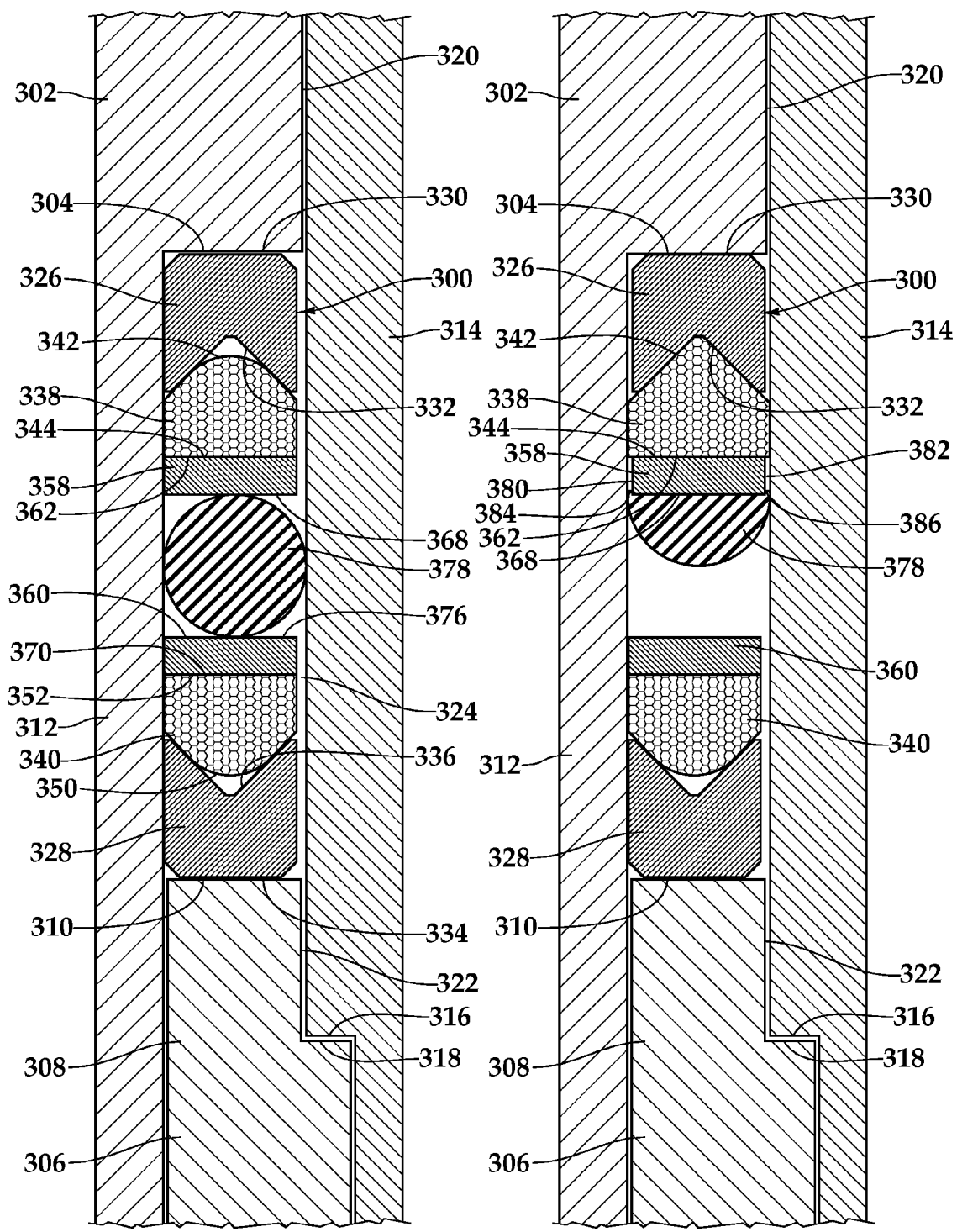
FIG. 5 is a cross sectional view of a sealing array positioned in a gland groove in its resting configuration according to an embodiment of the present invention.
FIG. 6 is a cross sectional view of the sealing array of FIG. 5 positioned in a gland groove in its energized and sealing configuration according to an embodiment of the present invention.

Referring now to FIG. 5, therein is depicted a sealing array according to an embodiment of the present invention that is positioned between cooperating tubular members and is generally designated 300. A tubing system includes outer tubular section 302 with shoulder 304 and outer tubular section 306 with upper end portion 308 and upper surface 310 which is received within a radially reduced portion 312 of outer tubular section 302. Together, shoulder 304 and radially reduced portion 312 of outer tubular section 302 and upper surface 310 of outer tubular section 306 form a gland groove for housing sealing array 300. Disposed adjacent to outer tubular section 302 and outer tubular section 306 is a tubular member 314 that includes a shoulder 316 that interacts with no-go shoulder 318 of outer tubular section 306. As illustrated, a clearance gap 320 exists between tubular member 314 and outer tubular section 302, a clearance gap 322 exists between tubular member 314 and outer tubular section 306, and a clearance gap 324 generally exists between tubular member 314 and sealing array 300.

Sealing array 300 includes a pair of oppositely disposed adaptor members 326, 328. As illustrated in the cross sectional view of FIG. 5, upper adaptor member 326 has a substantially planar surface 330 that is adjacent to shoulder 304 of outer tubular section 302. Upper adaptor member 326 also has a substantially V-shaped lower surface 332. Likewise, lower adaptor member 328 has a substantially planar surface 334 that is adjacent to upper surface 310 of outer tubular section 306. Lower adaptor member 328 also has a substantially V-shaped upper surface 336. Adaptor members 326, 328 are both substantially ring shaped and are sized to fit in the cylindrical gland groove created between outer tubular sections 302, 306 and between radially reduced portion 312 of outer tubular section 302 and tubular member 314.

Sealing array 300 includes a pair of oppositely disposed backup rings 338, 340. As illustrated in the cross sectional view of FIG. 5, upper backup ring 338 has a substantially arc shaped convex surface 342 that is adjacent to substantially V-shaped surface 332 of adaptor member 326. Upper backup ring 338 also has a substantially planar surface 344. Likewise, lower backup ring 340 has a substantially arc shaped convex surface 350 that is adjacent to substantially V-shaped surface 336 of adaptor member 328. Lower backup ring 340 also has a substantially planar surface 352. Backup rings 338, 340 are both substantially ring shaped and are sized to fit in the cylindrical gland groove created between outer tubular sections 302, 306 and between radially reduced portion 312 of outer tubular section 302 and tubular member 314.

Sealing array 300 includes a pair of oppositely disposed cap rings 358, 360. As illustrated in the cross sectional view of FIG. 5, upper cap ring 358 has a substantially planar surface 362 that engages with substantially planar surface 344 of backup ring 338. Upper cap ring 358 also has a substantially planar surface 368. Likewise, lower cap ring 360 has a substantially planar surface 270 that engages with substantially planar surface 352 of backup ring 340. Lower cap ring 360 also has a substantially planar surface 376. Cap rings 358, 360 are both substantially ring shaped and are sized to fit in the cylindrical gland groove created between outer tubular sections 302, 306 and between radially reduced portion 312 of outer tubular section 302 and tubular member 314. In addition, sealing array 300 includes an O-ring seal 378 positioned between cap rings 358, 360. O-ring seal 378 is substantially ring shaped and is sized to fit in the cylindrical gland groove created between outer tubular sections 302, 306 and between radially reduced portion 312 of outer tubular section 302 and tubular member 314.

The operation of sealing array 300 will now be described with reference to FIG. 6. As with sealing array 100, sealing array 300 is a bidirectional sealing array. In the illustrated embodiment, the pressure in the region below clearance gap 322 is higher than the pressure in the region above clearance gap 320. Accordingly, the upper portion of sealing array 300 has been energized and is providing a seal that prevents pressure from escaping from the region below clearance gap 322 into the region above clearance gap 320.

As illustrated, the pressure has caused O-ring 378 to become compressed against surface 368 of cap ring 358. The force acting on cap ring 358 presses cap ring 358 into backup ring 338 and likewise presses backup ring 338 into adaptor member 326. The interaction between surface 362 of cap ring 358 and surface 344 of backup ring 338 as well as the interaction between surface 332 of adaptor member 326 and surface 342 of backup ring 338 causes backup ring to be energized resulting in longitudinal compression and radial expansion of backup ring 338. The energized backup ring 338 establishes a seal against the inner surface of radially reduced portion 312 of outer tubular section 302 and the outer surface of tubular member 314.

In addition to applying the upwardly directed force on backup ring 338, cap ring 358 is substantially centered between the inner surface of radially reduced portion 312 of outer tubular section 302 and the outer surface of tubular member 314, thereby forming narrow extrusion gaps 380, 382 therebetween. Under sufficient pressure, as depicted in FIG. 6, O-ring 378 extrudes into the extrusion gaps as illustrated at 384 and 386. Accordingly, the configuration of seal array 300 allows a desirable amount of O-ring extrusion to assure a complete seal but prevents excessive O-ring extrusion through the use of backup ring 338 which establishes a barrier to additional O-ring extrusion when backup ring 338 is energized. The extent of the O-ring extrusion may be determined by the length of cap ring 358.

In addition to applying the upwardly directed force to energize backup ring 338 and establishing the extrusion gaps to assure a complete seal, cap ring 358 provides a barrier between O-ring 378 and backup ring 338 which prevents physical and chemical interaction therebetween.

Referring now to FIG. 7, therein is depicted a sealing array according to an embodiment of the present invention that is positioned between cooperating tubular members and is generally designated 400. A tubing system includes outer tubular section 402 with shoulder 404 and outer tubular section 406 with upper end portion 408 and upper surface 410 which is received within a radially reduced portion 412 of outer tubular section 402. Together, shoulder 404 and radially reduced portion 412 of outer tubular section 402 and upper surface 410 of outer tubular section 406 form a gland groove for housing sealing array 400. Disposed adjacent to outer tubular section 402 and outer tubular section 406 is a tubular member 414 that includes a shoulder 416 that interacts with no-go shoulder 418 of outer tubular section 406. As illustrated, a clearance gap 420 exists between tubular member 414 and outer tubular section 402, a clearance gap 422 exists between tubular member 414 and outer tubular section 406, and a clearance gap 424 generally exists between tubular member 414 and sealing array 400.

Sealing array 400 includes a pair of oppositely disposed adaptor members 426, 428. As illustrated in the cross sectional view of FIG. 7, upper adaptor member 426 has a substantially planar surface 430 that is adjacent to shoulder 404 of outer tubular section 402. Upper adaptor member 426 also has a substantially V-shaped lower surface 432. Likewise, lower adaptor member 428 has a substantially planar surface 434 that is adjacent to upper surface 410 of outer tubular section 406. Lower adaptor member 428 also has a substantially V-shaped upper surface 436. Adaptor members 426, 428 are both substantially ring shaped and are sized to fit in the cylindrical gland groove created between outer tubular sections 402, 406 and between radially reduced portion 412 of outer tubular section 402 and tubular member 414.

Sealing array 400 includes a pair of oppositely disposed backup rings 438, 440. As illustrated in the cross sectional view of FIG. 7, first upper backup ring 438 has a substantially arc shaped convex surface 442 that is adjacent to substantially V-shaped surface 432 of adaptor member 426. First upper backup ring 438 also has a substantially arc shaped concave surface 444. Likewise, first lower backup ring 440 has a substantially arc shaped convex surface 450 that is adjacent to substantially V-shaped surface 436 of adaptor member 428. First lower backup ring 440 also has a substantially arc shaped concave surface 452. Backup rings 438, 440 are both substantially ring shaped and are sized to fit in the cylindrical gland groove created between outer tubular sections 402, 406 and between radially reduced portion 412 of outer tubular section 402 and tubular member 414.

Sealing array 400 includes a second pair of oppositely disposed backup rings 439, 441. As illustrated in the cross sectional view of FIG. 7, second upper backup ring 439 has a substantially arc shaped convex surface 443 that is adjacent to surface 444 of first upper backup ring 438. Second upper backup ring 439 also has a substantially arc shaped concave surface 445 with substantially planer outer segments 246, 248. Likewise, second lower backup ring 441 has a substantially arc shaped convex surface 451 that is adjacent to surface 452 of first lower backup ring 440. Second lower backup ring 441 also has a substantially arc shaped concave surface 453 with substantially planer outer segments 454, 456. Backup rings 439, 441 are both substantially ring shaped and are sized to fit in the cylindrical gland groove created between outer tubular sections 402, 406 and between radially reduced portion 412 of outer tubular section 402 and tubular member 414.

Sealing array 400 includes a pair of oppositely disposed cap rings 458, 460 depicted in the form of extended D-rings. As illustrated in the cross sectional view of FIG. 7, upper cap ring 458 has a substantially arc shaped convex surface 462 with substantially planer outer segments 464, 466 that nest with substantially arc shaped concave surface 445 and substantially planer outer segments 446, 448 of backup ring 439. Upper cap ring 458 also has a substantially planar surface 468. Likewise, lower cap ring 460 has a substantially arc shaped convex surface 470 with substantially planer outer segments 472, 474 that nest with substantially arc shaped concave surface 453 and substantially planer outer segments 454, 456 of backup ring 441. Lower cap ring 460 also has a substantially planar surface 476. Cap rings 458, 460 are both substantially ring shaped and are sized to fit in the cylindrical gland groove created between outer tubular sections 402, 406 and between radially reduced portion 412 of outer tubular section 402 and tubular member 414. In addition, sealing array 400 includes an O-ring seal 478 positioned between cap rings 458, 460. O-ring seal 478 is substantially ring shaped and is sized to fit in the cylindrical gland groove created between outer tubular sections 402, 406 and between radially reduced portion 412 of outer tubular section 402 and tubular member 414.

The operation of sealing array 400 will now be described with reference to FIG. 8. As with sealing array 100, sealing array 400 is a bidirectional sealing array. In the illustrated embodiment, the pressure in the region below clearance gap 422 is higher than the pressure in the region above clearance gap 420. Accordingly, the upper portion of sealing array 400 has been energized and is providing a seal that prevents pressure from escaping from the region below clearance gap 422 into the region above clearance gap 420.

As illustrated, the pressure has caused O-ring 478 to become compressed against surface 468 of cap ring 458. The force acting on cap ring 458 presses cap ring 458 into backup ring 439, presses backup ring 439 into backup ring 438 and presses backup ring 438 into adaptor member 426. The interaction between surface 462 of cap ring 458 and surface 445 of backup ring 439 as well as the interaction between surface 432 of adaptor member 426 and surface 442 of backup ring 438 causes both backup rings to be energized resulting in longitudinal compression and radial expansion of backup rings 438, 439. The energized backup rings 438, 439 establish seals against the inner surface of radially reduced portion 412 of outer tubular section 402 and the outer surface of tubular member 414. The seal created by energized backup ring 439 is referred to herein as a primary outer seal while seal created by energized backup ring 438 is referred to herein as a secondary outer seal.

In addition to applying the upwardly directed force on backup ring 439, cap ring 458 is substantially centered between the inner surface of radially reduced portion 412 of outer tubular section 402 and the outer surface of tubular member 414, thereby forming narrow extrusion gaps 480, 482 therebetween. Under sufficient pressure, as depicted in FIG. 8, O-ring 478 extrudes into the extrusion gaps as illustrated at 484 and 486. Accordingly, the configuration of seal array 400 allows a desirable amount of O-ring extrusion to assure a complete seal but prevents excessive O-ring extrusion through the use of backup ring 439 which establishes a barrier to additional O-ring extrusion at 446, 448 when backup ring 439 is energized. The extent of the O-ring extrusion may be determined by the length of the extended portion of cap ring 458 when cap ring 458 has the extended D-ring shape as depicted.

In addition to applying the upwardly directed force to energize backup ring 438 and establishing the extrusion gaps to assure a complete seal, cap ring 458 provides a barrier between O-ring 478 and backup ring 439 which prevents physical and chemical interaction therebetween.

Even though a single pair of backup rings has been depicted in FIGS. 1-6 and two pairs of backup rings have been depicted in FIGS. 7-8, it should be understood by those skilled in the art that the sealing arrays of the present invention may including any number of backup rings as desired and the material of such backup rings will be selected based upon the desired sealing performance in the proposed application. In addition, it should be understood by those skilled in the art that additional spacer members may be used with the sealing arrays of the present invention to fill the width of a gland groove. Typically, such spacer members will be disposed between one or both of the adaptor members and the adjacent tubular surface.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A sealing array for positioning in an annular space between first and second tubular members each having a cylindrical sealing surface, the sealing array operable to provide a seal therebetween, the sealing array comprising:

first and second backup rings, each having a concave surface and each defining a primary outer seal member of the sealing array;

first and second rigid cap rings positioned between the first and second backup rings, each having a convex surface and an oppositely disposed substantially planar surface that is substantially perpendicular to the sealing surfaces of the tubular members, the convex surface of the first cap ring engaging the concave surface of the first backup ring and the convex surface of the second cap ring engaging the concave surface of the second backup ring, the cap rings sized to form a first annular extrusion gap with the sealing surface of the first tubular member and a second annular extrusion gap with the sealing surface of the second tubular member; and an energizing element disposed between the planar surfaces of the cap rings, wherein, in a first energized configuration upon application of sufficient pressure in a first direction, the energizing element contacts the planar surface of the first cap ring, the first cap ring compresses the first backup ring into a sealing configuration against the first and second tubular members and the energizing element extrudes into the first and second annular extrusion gaps associated with the first cap ring; and wherein, in a second energized configuration upon application of sufficient pressure in a second direction, the energizing element contacts the planar surface of the second cap ring, the second cap ring compresses the second backup ring into a sealing configuration against the first and second tubular members and the energizing element extrudes into the first and second annular extrusion gaps associated with the second cap ring.

2. The sealing array as recited in claim 1 wherein the backup rings further comprise V-rings.

3. The sealing array as recited in claim 1 wherein the backup rings further comprise a flexible graphite.

4. The sealing array as recited in claim 1 wherein the backup rings further comprise a thermoplastic.

5. The sealing array as recited in claim 1 wherein the caps rings further comprise D-rings.

6. The sealing array as recited in claim 1 wherein the caps rings further comprise a metal.

7. The sealing array as recited in claim 1 wherein the caps rings further comprise a stainless steel.

8. The sealing array as recited in claim 1 wherein the energizing element further comprises an O-ring.

9. The sealing array as recited in claim 1 wherein the energizing element further comprises an elastomer.

10. The sealing array as recited in claim 1 further comprising at least one addition pair of backup rings each forming a secondary outer seal member, each secondary outer seal member having a concave surface engaging a convex surface of one of the primary outer seal members or one of the other secondary outer seal members.

11. The sealing array as recited in claim 1 further comprising a pair of adaptor members each having a concave surface engaging a convex surface of one of the primary outer seal members.

12. The sealing array as recited in claim 11 wherein the adaptor members further comprise a metal.

13. The sealing array as recited in claim 11 wherein the adaptor members further comprise a stainless steel.

14. A sealing array for positioning in an annular space between tubular members each having a cylindrical sealing surface, the sealing array operable to provide a seal therebetween, the sealing array comprising:

a pair of oppositely disposed flexible graphite V-rings, each having a concave surface and each defining a primary outer seal member of the sealing array;

a pair of stainless steel cap rings, each having a convex surface and an oppositely disposed substantially planar surface that is substantially perpendicular to the sealing surfaces of the tubular members, the convex surface of each of the cap rings engaging a concave surface of one of the V-rings to energize the V-rings upon the application of sufficient pressure, the cap rings sized to form extrusion gaps with the sealing surfaces of the tubular members; and an elastomeric O-ring disposed between the planar surfaces of the cap rings, wherein, in a first energized configuration upon application of sufficient pressure in a first direction, the O-ring contacts the planar surface of a first cap ring, the first cap ring compresses a first V-ring into a sealing configuration against the tubular members and the O-ring extrudes into the extrusion gaps formed by the first cap ring and the tubular members; and wherein, in a second energized configuration upon application of sufficient pressure in a second direction, the O-ring contacts the planar surface of a second cap ring, the second cap ring compresses a second V-ring into a sealing configuration against the tubular members and the O-ring extrudes into the extrusion gaps formed by the second cap ring and the tubular members.

15. The sealing array as recited in claim 14 further comprising at least one addition pair of V-rings each forming a secondary outer seal member, each secondary outer seal member having a concave surface engaging a convex surface of one of the primary outer seal members or one of the other secondary outer seal members.

16. The sealing array as recited in claim 14 further comprising a pair of adaptor members each having a concave surface engaging a convex surface of one of the primary outer seal members.

17. A sealing array for positioning in an annular space between tubular members each having a cylindrical sealing surface, the sealing array operable to provide a seal therebetween, the sealing array comprising:

a pair of oppositely disposed backup rings, each defining a primary outer seal member of the sealing array;

a pair of rigid cap rings, each having a substantially planar surface that is substantially perpendicular to the sealing surfaces of the tubular members and each having an oppositely disposed surface that engages one of the backup rings to energize the backup rings upon the application of sufficient pressure, the cap rings sized to form extrusion gaps with the sealing surfaces of the tubular members; and an energizing element disposed between the planar surfaces of the cap rings, wherein, in a first energized configuration upon application of sufficient pressure in a first direction, the energizing element contacts the planar surface of a first cap ring, the first cap ring compresses a first backup ring into a sealing configuration against the tubular members and the energizing element extrudes into the extrusion gaps formed by the first cap ring and the tubular members; and wherein, in a second energized configuration upon application of sufficient pressure in a second direction, the energizing element contacts the planar surface of a second cap ring, the second cap ring compresses a second backup ring into a sealing configuration against the tubular members and the energizing element extrudes into the extrusion gaps formed by the second cap ring and the tubular members.

18. The sealing array as recited in claim 17 further comprising a pair of adaptor members each having a concave surface engaging a convex surface of one of the primary outer seal members.

19. The sealing array as recited in claim 17 further comprising at least one addition pair of backup rings each forming a secondary outer seal member, each secondary outer seal member having a concave surface engaging a convex surface of one of the primary outer seal members or one of the other secondary outer seal members.

* * * * *